July 17, 1934.  G. A. BARKER  1,966,434
LUBRICATING SYSTEM
Filed May 13, 1931  2 Sheets-Sheet 1
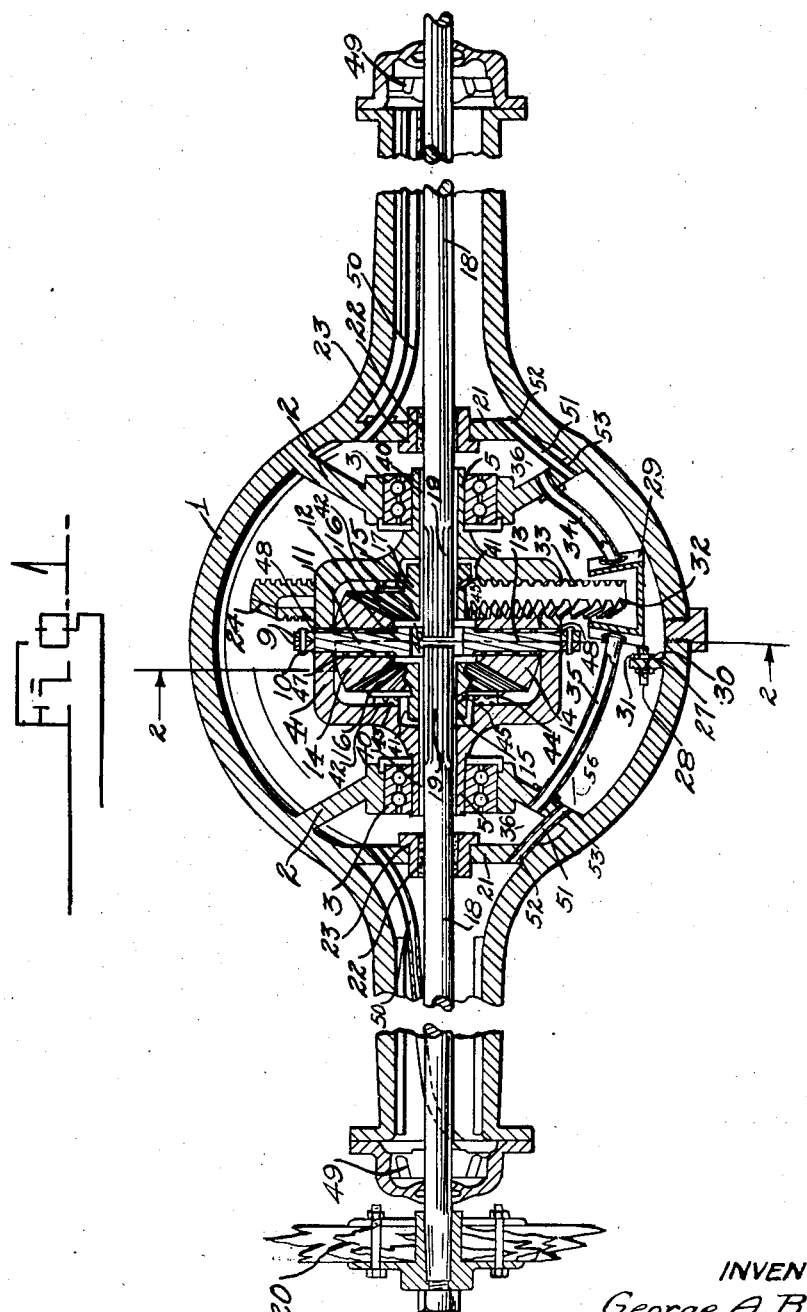
INVENTOR
George A. Barker
BY
ATTORNEY.

July 17, 1934.  G. A. BARKER  1,966,434
LUBRICATING SYSTEM
Filed May 13, 1931  2 Sheets-Sheet 2
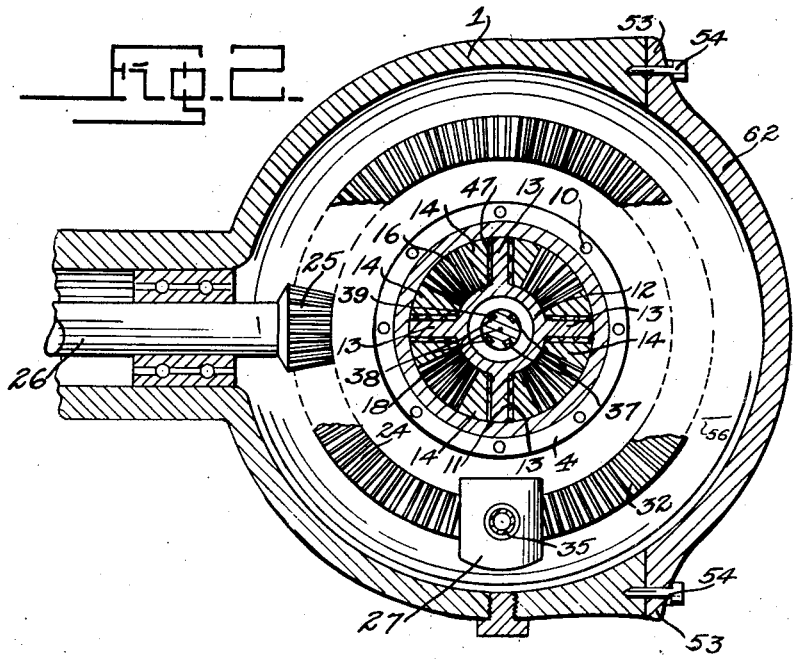
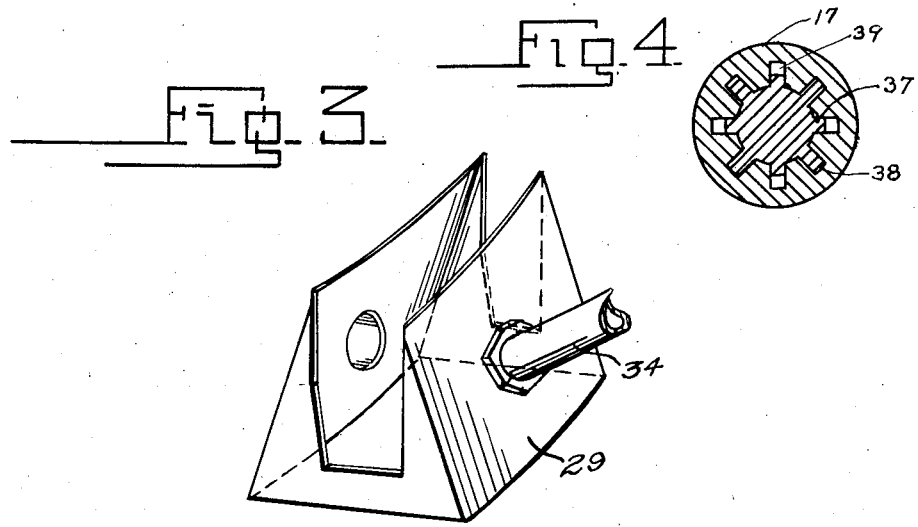
INVENTOR
George A. Barker.
BY
ATTORNEY Patented July 17, 1934

UNITED STATES PATENT OFFICE 1,966,434

LUBRICATING SYSTEM

George A. Barker, Rochester, N. Y.

Application May 13, 1931, Serial No. 537,078

29 Claims. (Cl. 184—11)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a lubricating system to be utilized with transmission organizations embodying in their make-up various forms of gears. Broadly it contemplates a lubricating system provided with a pressure developing means of which one of the gears of the organization forms a component and more specifically a housing so constructed with webs and conduits as to provide an efficient ensemble to co-operate with the specific construction of the elements of the transmission system to effect thorough lubrication of the parts.

Briefly, the invention comprises a housing constructed with webs designed to support holder bearings and partitions outside the webs whereby there is provided chambers into which lubricant may be forced. The holder bearings support a differential case which encompasses the well known beveled pinions and side gears that constitute the differential proper. Affixed to the differential case is a driving gear or ring gear designed to be rotated by a driving pinion. Supported on an abutment on the bottom and inside of the housing is a trough-like constricting element open at its two ends and shaped to closely hug the ring gear at what may be termed its forward end. The sides of the trough-like element recede from the ring gear in a direction opposite to the direction of rotation thereof with the result that there is provided a trough of more or less pyramidal form converging in the direction of rotation of the ring gear.

Since the lower portion of the differential housing constitutes an oil reservoir or sump, rotation of the gear wedges oil into the cup-like trough from which it may escape through the intermediary of conduits leading to the chambers provided between the holder bearing webs and the before mentioned partitions. From these chambers passages are provided to carry the lubricant to those parts of the organization where positive lubrication is deemed essential. To facilitate the lubricating process, the ensemble is so designed as to bring the lubricant into positions throughout the transmission organization wherein it will be acted upon by centrifugal force in a direction to assist the pressure developing means.

One object of the invention is to produce a positive lubricating system.

Another object of the invention is to furnish a lubricating system capable of effectively oiling remote and difficultly accessible bearings.

Still another object is to provide a system of oiling wherein centrifugal force effectively co-operates with a pressure developing means for forcing the lubricant through the bearings to be oiled.

A further object of the invention is to provide a lubricating system readily adaptable to diverse gear organizations and comparatively inexpensive to construct.

Yet another object is to provide a lubricating system wherein the pressure developing means is susceptible of adjustment to compensate irregularities of replacements.

Another object again is to provide a pressure developing means that is easily modifiable for adaptation to various types of gears.

In order that the invention may be more readily understood reference is had to the accompanying drawings forming a part of this specification and in which—

Fig. 1 is a vertical sectional view depicting the invention as applied to the differential of an automobile;

Fig. 2 is a section at 2—2 on Fig. 1,

Fig. 3 shows one form of the pressure developing trough in perspective; and

Fig. 4 is a sectional view of the splined end of an axle and hub of the differential side gears in mesh with the same.

A differential housing broadly designated as (1) is constructed with webs (2) for the supporting of holder bearings (3), designed to operate as journals for a differential case (4) provided with hubs (5) projecting into the bearings (3). In effect, the differential case is unitary but, for the purpose of facilitating assemblage it is constructed in two parts which are intended to be fixed together by flanges (9) through the intermediary of rivets (10) or by similar means. Supported within the differential case (4) is the differential spider (11) comprising a ring (12) with four legs or trunnions (13). The trunnions are fixed to the differential case by any means expedient and support between the differential case (4) and ring (12), the four beveled gears (14). Fashioned within the differential case are the bearings (15) supporting the differential side gears (16) through the intermediary of their hubs (17).

Axle shafts (18) are splined as at (19) to the differential side gears (16) and passed through without contacting the holder bearing (3) to the wheels broadly designated as (20). At the wheel sides of the holder bearing webs (2), partitions (21) are constructed within the differential housing. These partitions carry the felt washers (22) within glands (23) with the result that the partition effectively separates the wheel sides of the differential housing from the differential proper. Affixed to the differential case is a driving gear or ring gear (24) adapted to be rotated by a driving pinion (25) internal with the drive shaft (26). An abutment (27) provided in the lower interior of the differential housing supports through the intermediary of adjusting screw (28) a member cooperating with the ring gear (24), which in the instant construction is in the form of a more or less U-like trough (29) bestriding the ring gear.

The trough proper is pyramidal or wedge shaped in form and constructed so as to closely approach the ring gear at one end but recede therefrom in a direction converse to the direction of rotation. Adjusting nuts (30) and (31) co-operate with the adjusting screw (28) and abutment (27) to facilitate the positioning and adjustment of the U-like trough with respect to the ring gear. The ring gear is provided with the usual teeth (32) and there is also preferably provided the false teeth (33) on the opposite side of the ring gear for a purpose which will hereinafter appear. Conduits (34) and (35) lead off from a point near the forward end of the U-like trough to the chambers (36) provided between the holder bearing webs (2) and the partitions (21). By the forward end of the U-like trough is meant that part thereof which most closely hugs the ring gear; or in other words that end farthest advanced in the direction of rotation thereof.

Having now described the fundamental elements of the organization, the details thereof which facilitate the passage of lubricant from the U-like trough to the parts to be oiled, will be considered.

In the rotation of the ring gear, by virtue of the fact that the lower portion of the differential housing forms an oil sump and is filled to a point designated by (56), oil is squeezed into the wedge like interior of the trough and forced through the conduits (34) and (35) to the chambers (36), wherein it builds up and lubricates bearings (3). The axles (18) are splined as before stated to the differential side gears (16), but certain of the keys as indicated on Fig. 4 at (37) are made of less height than the keys (38) with the result that a passage indicated at (39) is provided through which lubricant advancing along the axle (18) may enter into the differential spider ring (12). Because of the fact that the hubs (5) at the point at which they enter the holder bearings (3) do not contact the axles (18), a passage (40) is provided through which lubricant may advance along the axles and enter the differential case. Grooves (41) provided in the hubs of the differential side gears (16) form a continuation of the passage (40) and permit lubricant to have access to the space between the differential case and the differential side gear. Grooves (41) open into this space at a point where there is provided a bronze thrust washer (42) having spiralled oil grooves (43) and (44) on both sides thereof in contact with the differential case and the differential side gears respectively. To more copiously supply lubricant to grooves (44) oil passages (45) may be bored through the hubs of the differential side gears (16) to communicate the grooves with passage (39) between the splined connections of the side gears (16) and shafts (18).

Lubricant entering the differential spider ring from the passage (40) has a tendency to flow outwardly around the edges of the ring (12) at point (46) to a spiralled oil groove (47) provided in the bevel gears (14), or if desirable in a bushing provided between the bevel gears (14) and the trunnions (13). Lubricant advancing, due to the pressure developed by the pump and also by virtue of centrifugal force generated through the rotation of case (4), passes along the spiralled grooves (43), (44) and (47) and out through a small opening (48) provided at each trunnion through the differential case (4) from which it returns to the sump. These openings may be made of such size that they permit free passage of lubricant therethrough, or they may also serve as dams to cause lubricant to build up in the case with the result that the transmission mechanism works in a bath of oil. For the purpose of oiling the wheel bearings (49) positioned near the ends of axles (18), conduits (50) lead from the upper portion of the chambers (36). To permit the lubricant transmitted to these bearings to be returned to the sump, conduits (51) passing through chambers (36) are provided, these conduits having inlets (52) externally of the partition (21) and outlets (53) on the differential side of the holder bearing webs (2).

Having described the invention in detail its operation is briefly as follows:

Pressure generated through the rotation of the ring gear (24) cooperating with the U-like trough (29) forces lubricant into chamber (36) wherein it builds up to a point sufficient to effectively take care of the oiling of the holder and wheel bearings. From the chamber (36) it advances through passages (40), (41) and (45) as before described, and after having thoroughly lubricated the elements within the differential case passes out therefrom through (48) and back to the sump. From chamber (36) also lubricant follows conduit (50) to the wheel bearings and returns through conduit (51) to the sump.

It is obvious that not only have I provided an effective pressure developing means for the pumping of lubricant to the places where it is required, but I have also, with respect to the elements within the differential case, taken advantage of the centrifugal force developed by rotation of the case to cause the oil to more positively advance. To facilitate the assemblage of the elements heretofore enumerated the differential housing (1) is provided with a cover plate (62) designed to be affixed to the differential housing through the intermediary of flanges (53') and bolts (54).

It is to be understood that I do not limit the application of my invention to a differential organization but have merely illustrated it therewith in an exemplary manner. It is to be further understood that the above described constructions may be replaced by mechanical equivalents without departing from the scope of the invention.

Having described my invention what I claim as new and wish to secure by Letters Patent is:

1. In a device of the class described, a housing embodying a sump to contain a lubricant, a web integral with the housing to support a holder bearing, a partition within the housing whereby there is provided a chamber between the web and partition, means for introducing lubricant from the sump to the chamber, a holder bearing supported by the web, a differential case journalled in the bearing, a transmission mechanism within the differential case and means for leading lubricant from the chamber to the transmission mechanism within the case.

2. In a device of the class described, a housing embodying a sump to contain a lubricant, webs integral with the housing to support holder bearings, partitions integral with the housing whereby there is provided chambers between the webs and partitions, means for introducing the lubricant from the sump to the chambers to lubricate the holder bearings, a differential case journalled in the bearings, a transmission mechanism within the case and means for leading lubricant from the chambers to the transmission mechanism.

3. In a device of the class described, a housing embodying a sump to contain a lubricant, a transmission case supported for rotation within the housing, a holder bearing web integral with the housing, a bearing supported by the web to form a journal for the differential case, a partition integral with the case and forming with the holder web a chamber, an axle bearing, means to introduce lubricant from the sump to the chamber, a conduit leading from the chamber to the axle bearing, a second conduit for returning lubricant from the axle bearing to the sump, and means for leading lubricant from the chamber to the case.

4. In a device of the class described, a housing embodying a sump to contain a lubricant, a transmission case supported for rotation within the housing, a ring gear fixed for rotation with the case, with its lower edge dipping into the sump, a trough-like element bestriding the ring gear, the walls of said element converging in the direction of rotation of said gear, whereby in rotation of the gear lubricant is squeezed between the gear and the element, and means leading from the element for introducing lubricant to the case.

5. In a device of the class described, a housing embodying a sump to contain a lubricant, a transmission case supported for rotation within the housing, a ring gear fixed to the case to rotate therewith with its lower edge dipping into the sump, an abutment integral with the housing, a trough-like element having walls converging in the direction of rotation and bestriding the ring gear, a screw supported by the abutment and maintaining the elements in position, lubricant conduits leading from the element to the transmission case and means provided on the screw to adjust the position of the element.

6. In a device of the class described having bearings to be lubricated, a housing embodying a sump to contain a lubricant, a transmission case supported for rotation within the housing, a ring gear affixed to the case to rotate therewith with its lower edge dipping into the sump, a trough-like element having walls converging in the direction of rotation of and bestriding the ring gear and providing a pressure developing means therewith, and means for transmitting lubricant from the pressure developing means to the bearings.

7. In a device of the class described, a housing embodying a sump and lateral chambers to contain a lubricant; a transmission case disposed between and in lubricant conducting communication with said chambers; a conduit leading upwardly from said sump to each chamber; and means to force lubricant into said conduit from said sump.

8. In a device of the class described, a housing embodying a sump and lateral chambers to contain a lubricant; a transmission case disposed between and in lubricant conducting communication with said chambers; a conduit leading upwardly from said sump to each chamber; and means including a member carried by said case to force lubricant into said conduit from said sump.

9. In a device of the class described, a housing embodying a sump and lateral chambers to contain a lubricant; a transmission case disposed between and in lubricant conducting communication with said chambers; a conduit leading upwardly from said sump to each chamber; and means comprising a rotating member and a stationary member, the latter having inner walls obliquely disposed to the plane of the former, said members exerting a squeezing action upon a portion of the lubricant in said sump to force said portion into said conduit from said sump.

10. In a device of the class described a housing embodying a sump and lateral chambers to contain a lubricant; a transmission case disposed between and in lubricant conducting communication with said chambers; a conduit leading upwardly from said sump to each chamber; and means comprising a rotating member and a stationary member, the latter having inner walls obliquely disposed to the plane of the former and carrying one end of said conduit, said members exerting a squeezing action upon a portion of the lubricant in said sump to force said portion into said conduit from said sump.

11. In a device of the class described a housing embodying a sump and lateral chambers to contain a lubricant; a transmission case disposed between and in lubricant conducting communication with said chambers; a conduit leading upwardly from said sump to each chamber; and pump means comprising a rotating portion of said case and a stationary wall convergently disposed to the plane of said rotating portion, said means to force lubricant into said conduit from said sump.

12. In a device of the class described a housing embodying a sump and lateral chambers to contain a lubricant; a transmission case disposed between and in lubricant conducting communication with said chambers; a conduit leading upwardly from said sump to each chamber; and means comprising a ring gear carried by said case and a wall disposed in said sump, the wall disposed convergently with respect to the plane of the gear teeth and forming therebetween a chamber in open communication with said conduit, said means to force lubricant into said conduit from said sump.

13. A pump comprising a lubricant reservoir; a rotating member whose lower portion is submerged in the lubricant in said reservoir, the peripheral surface of said member adapted to cause a movement of the lubricant; a wall disposed convergently with respect to the plane of said member in the direction of its rotation; and a conduit carried by said wall to convey to a distant point the lubricant squeezed between said wall and member.

14. A pump comprising a lubricant reservoir; a rotating member whose lower portion is submerged in the lubricant in said reservoir, the peripheral surface of said member adapted to cause a movement of the lubricant; a wall likewise submerged in the lubricant in said reservoir and disposed convergently with respect to the plane of said member in the direction of its rotation; and a conduit carried by said wall to convey to a distant point the lubricant squeezed between said wall and the submerged portion of said member.

15. A pump comprising a lubricant reservoir, a rotating member whose lower portion is submerged in the lubricant in said reservoir, the peripheral surface of said member adapted to cause a movement of the lubricant; a trough-like element having a wall disposed convergently with respect to the plane of said member in the direction of its rotation; and a conduit carried by said element to convey to a distant point the lubricant squeezed between said wall and member.

16. In a device of the class described, a housing embodying a sump and lateral chambers to contain a lubricant, holder bearings supported within the housing, a case disposed between said chambers, and journaled in the bearings, a transmission organization within the case, means for introducing lubricant from the sump to the lateral chambers and from the lateral chambers to the case, and a lubricant outlet from the case.

17. In a device of the class described, a housing embodying a sump and lateral intermediate chambers to contain a lubricant, a case supported by walls of said chambers for rotation within the housing, a differential spider affixed to the housing, bevelled pinions journaled on the spider, differential side gears meshed with the pinions and journaled within the case, an axle shaft splined to each of the differential side gears, means for introducing lubricant from the sump to the lateral chambers and from the lateral chambers through the splines into the case, and a lubricant outlet from the case so positioned that the lubricant is passed from the splines to the outlet and is acted upon by centrifugal force generated through rotation of the case.

18. In a device of the class described, a housing embodying a sump and lateral intermediate chambers to contain a lubricant, a case supported by walls of said chambers for rotation within the housing, a holder bearing in which the case is journaled, a transmission organization embodying differential side gears within the case, an axle splined to each of the differential side gears and passing through but not in contact with the holder bearing, an annular passage between the differential case and axle, means for introducing lubricant from the sump to the lateral chambers and from the chambers to the passage, and conduits from the passage to the inside of the case for permitting lubricant to reach the transmission organization therein.

19. In a device of the class described, a housing embodying a sump to contain a lubricant, a closed case supported for rotation within the housing, a transmission organization within the case, a ring gear affixed to the case and dipping into the sump, and means including a trough-like element embracing a portion of the periphery of the ring gear and having a wall obliquely disposed to the plane of the gear teeth, said gear and element serving to supply lubricant from the sump to the case.

20. In a device of the class described, a housing embodying a sump to contain a lubricant, a transmission case supported for rotation within the housing, a ring gear fixed to the case and tipping into the sump, a trough-like element in said sump and embracing a portion of the periphery of the ring gear at its lower edge, said element having a wall convergently disposed with respect to the plane of said gear to form therewith a pressure developing device, and means including a lubricant conduit leading off from the trough-like element for introducing lubricant to the case.

21. In a device of the class described, a housing embodying a sump to contain a lubricant, a case supported for rotation within the housing above said sump, a transmission organization within the case, a ring gear affixed to the case and dipping into the sump, and means including a trough-like element having converging walls in said sump, embracing a portion of the periphery of the ring gear and extending radially of said gear to cover the teeth thereof for forcing lubricant from the sump upwardly into the case.

22. In a lubrication system for a transmission organization and associated bearings the combination of a reservoir containing a supply of lubricant; a gear rotatable with the organization and dipping below the surface of the lubricant in said reservoir; a wall convergently disposed with respect to the plane of the gear in the direction of gear rotation to separate a portion of the lubricant from said supply, said wall coacting with the rotating gear to place said portion under pressure; and conduit means leading from said wall to convey the lubricant under pressure to and through a bearing and back to said reservoir.

23. In a lubrication system for a transmission organization and associated bearings the combination of a reservoir containing a supply of lubricant; a gear rotatable with the organization and dipping below the surface of the lubricant in said reservoir; a chamber within the reservoir formed about the lower edge portion of said gear, said chamber having a wall convergently disposed with respect to the plane of the gear teeth in the direction of gear rotation, said wall extending to beyond the root of the lowermost teeth of said gear, said chamber constituting means to separate a portion of the lubricant from said supply and to place said portion under pressure; and conduit means leading from said last named means to convey the lubricant under pressure to and through a bearing and back to said reservoir.

24. In a lubrication system for a transmission organization and associated bearings the combination of a reservoir containing a supply of lubricant; a gear rotatable with the organization and dipping below the surface of the lubricant in said reservoir; a wall within the reservoir with respect to the plane of the gear teeth convergently disposed in the direction of gear rotation, said wall extending to beyond the root of the lowermost teeth of said gear, and another wall substantially disposed in a radial plane of said gear to resist movement of the lubricant in the circumferential path of said gear, and to direct said lubricant out of the chamber formed by said gear and said walls, the chamber constituting means to separate a portion of the lubricant from said supply and to place said portion under pressure; and conduit means leading from said last named means to convey the lubricant under pressure to and through a bearing and back to said reservoir.

25. In a device of the class described, a housing embodying a sump to contain a lubricant, a transmission case supported for rotation within the housing, a gear encirclingly fixed to the case and dipping into the sump, a trough-like element in said sump and embracing a portion of the periphery of said gear at its lower edge, said element having a wall convergently disposed with respect to the plane of said gear to form therewith a pressure developing device, and an outlet from said element for the lubricant under pressure.

26. A housing embodying a sump to contain a lubricant; a transmission assemblage including a gear within said housing and rotatable through said sump; a chamber member in said sump and bestriding said gear to establish a lubricant pressure developing pump, said chamber having an unrestricted inlet for the lubricant and having an inner wall disposed obliquely to the face of said gear in the direction of rotation of said gear to create a squeezing action on the lubricant; and an outlet from said chamber for the lubricant under pressure.

27. A housing embodying a sump to contain a lubricant; a gear mounted in said housing above said sump; a second gear meshing with said first named gear and rotatable through said sump, and a chamber member having converging walls disposed in said sump and bestriding said second gear to establish a lubricant pressure developing means, said chamber having an unrestricted inlet for the lubricant and having a restricted outlet from said chamber with an attached conduit for conveying lubricant under pressure.

28. In a device of the class described, a housing embodying a sump adapted to contain a lubricant, a case supported for rotation within the housing, a ring gear dipping into the sump, and means including a trough-like element embracing a portion of the periphery of the ring gear and having a wall obliquely disposed to the plane of the gear teeth, said element having a lubricant conveying conduit communicating with said sump and casing, whereby, upon rotation of said gear, lubricant is conveyed to said case.

29. In a device of the class described having bearings to be lubricated, a housing embodying a sump to contain a lubricant, a transmission case supported for rotation within the housing, a ring gear affixed to the case to rotate therewith with its lower edge dipping into the sump, a box-like chamber formed about the lower edge portion of said gear, said chamber having side walls convergently disposed with respect to the plane of the gear teeth in the direction of gear rotation, the forward end wall of said chamber formed to closely engage the surfaces of said gear to provide an abutment preventing passage of lubricant outside of the teeth of said gear, the opposite end of said chamber providing an unrestricted inlet for the lubricant to the chamber, and means for transmitting lubricant from within the chamber to the bearings.

GEORGE A. BARKER.